United States Patent [19]

Hill

[11] Patent Number: 4,808,256

[45] Date of Patent: Feb. 28, 1989

[54] TIRE RECAPPING APPARATUS

[75] Inventor: Gilbert L. Hill, Troy, N.C.

[73] Assignee: Oliver Rubber Company, Oakland, Calif.

[21] Appl. No.: 163,700

[22] Filed: Mar. 3, 1988

[51] Int. Cl.$^4$ .............................................. B29D 30/56
[52] U.S. Cl. ..................................... 156/394.1; 425/17
[58] Field of Search ...................... 425/17, 19, 27, 24; 156/95, 96, 394.1, 423, 127, 285.7; 269/48.1, 48.4

[56] References Cited

U.S. PATENT DOCUMENTS

| | | | |
|---|---|---|---|
| 3,752,726 | 8/1973 | Barefoot | 156/96 |
| 4,624,732 | 11/1986 | King | 156/96 |
| 4,626,300 | 12/1986 | Barefoot | 425/17 |
| 4,662,834 | 5/1987 | Magee | 425/36 |
| 4,750,958 | 6/1988 | Magee | 156/96 |

Primary Examiner—Willard Hoag
Attorney, Agent, or Firm—Owen, Wickersham and Erickson

[57] ABSTRACT

A curing ring device for a precured tread rubber recapping apparatus of the type wherein a tire assembly with a strip of tread rubber in place on a tire carcass is surrounded by a flexible envelope. The curing ring device which seals the envelope around the tire in its bead area comprises an annular pressure ring that engages the envelope around the tire bead area and has a plurality of backup pads that engage the inside of the tire berad at spaced apart locations. A single handle controls linkage system that interconnects the pressure ring and the backup pads and closes them together so that sealing pressure is supplied by the ring against the envelope.

10 Claims, 3 Drawing Sheets

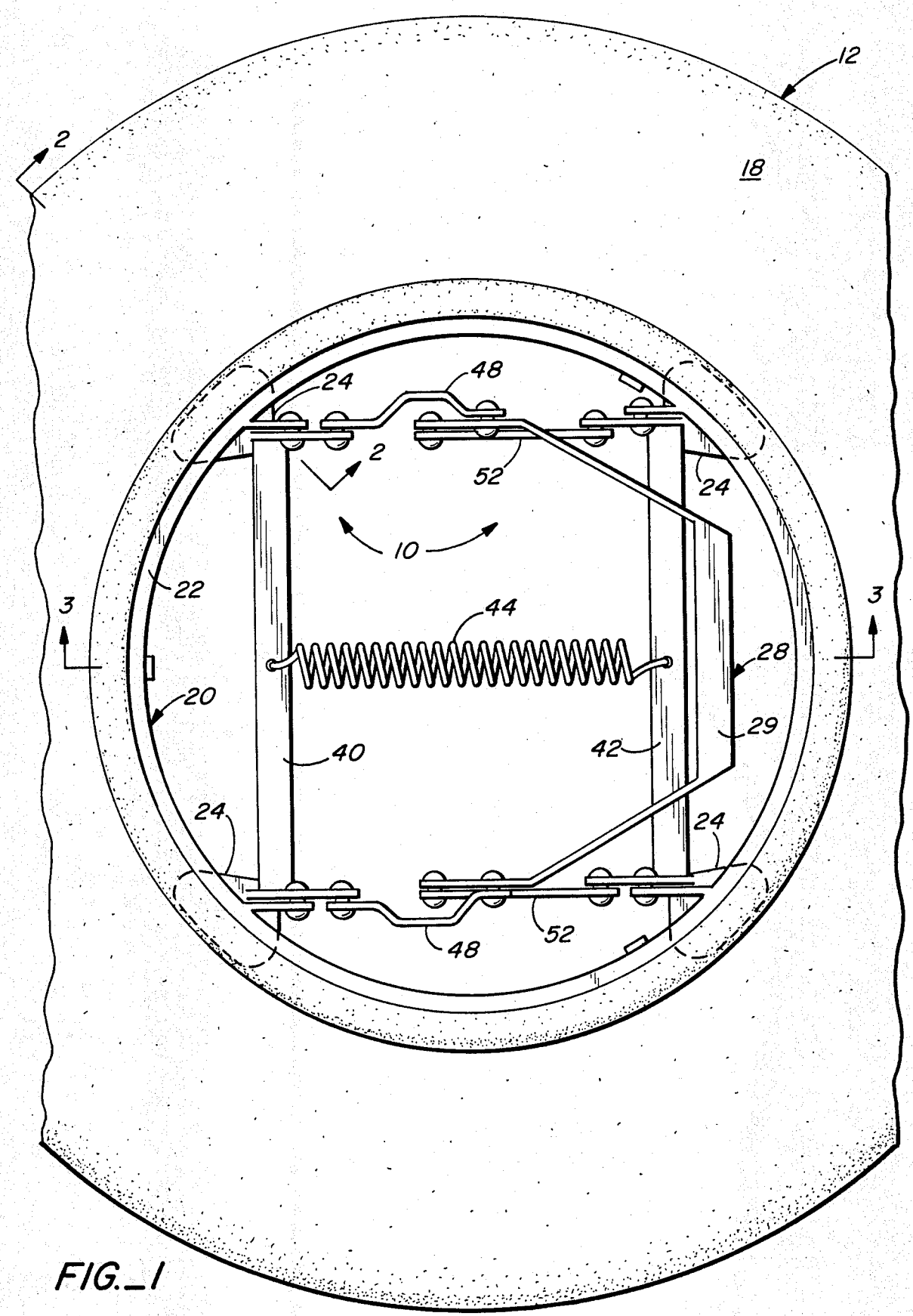
FIG._1

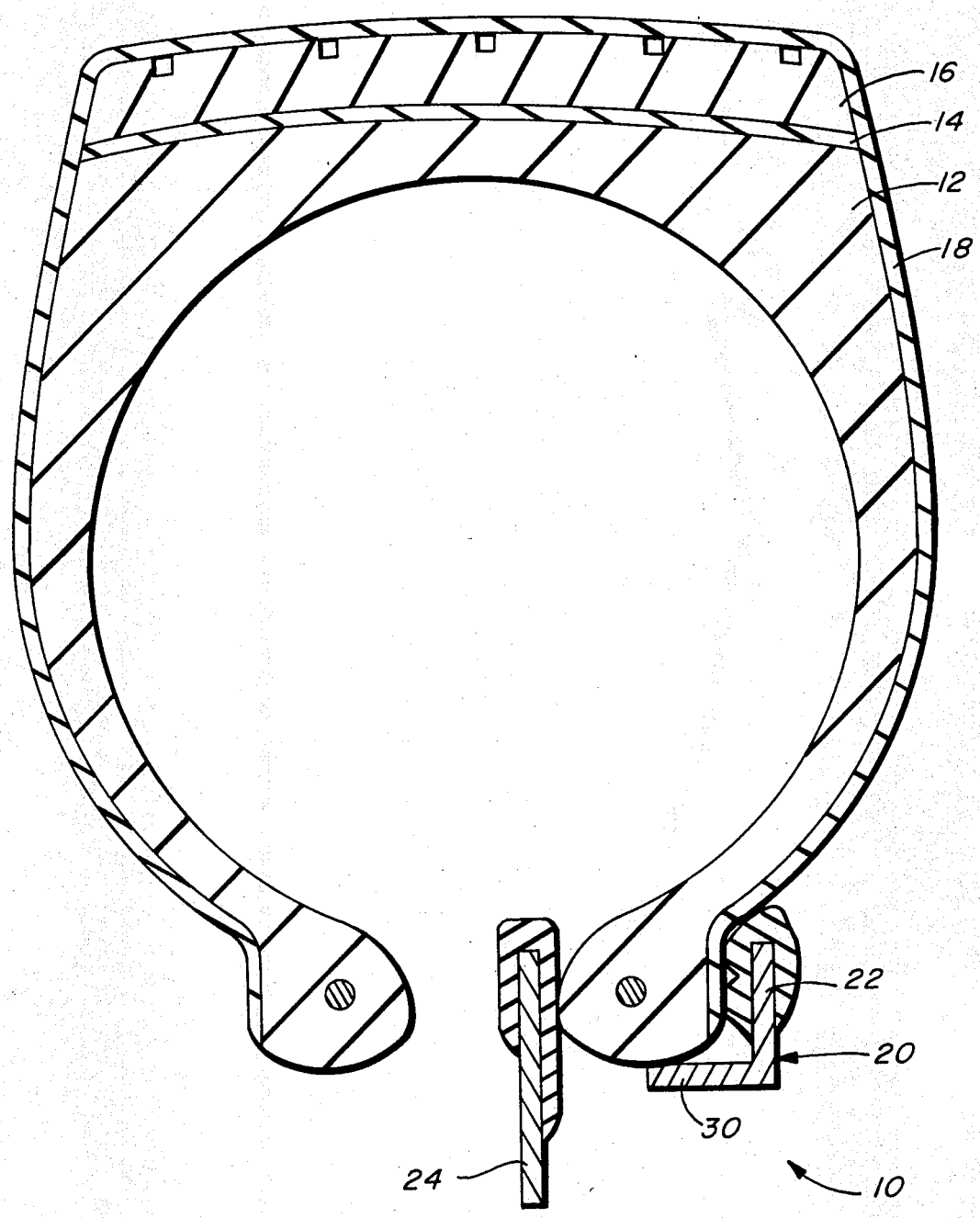
FIG._2

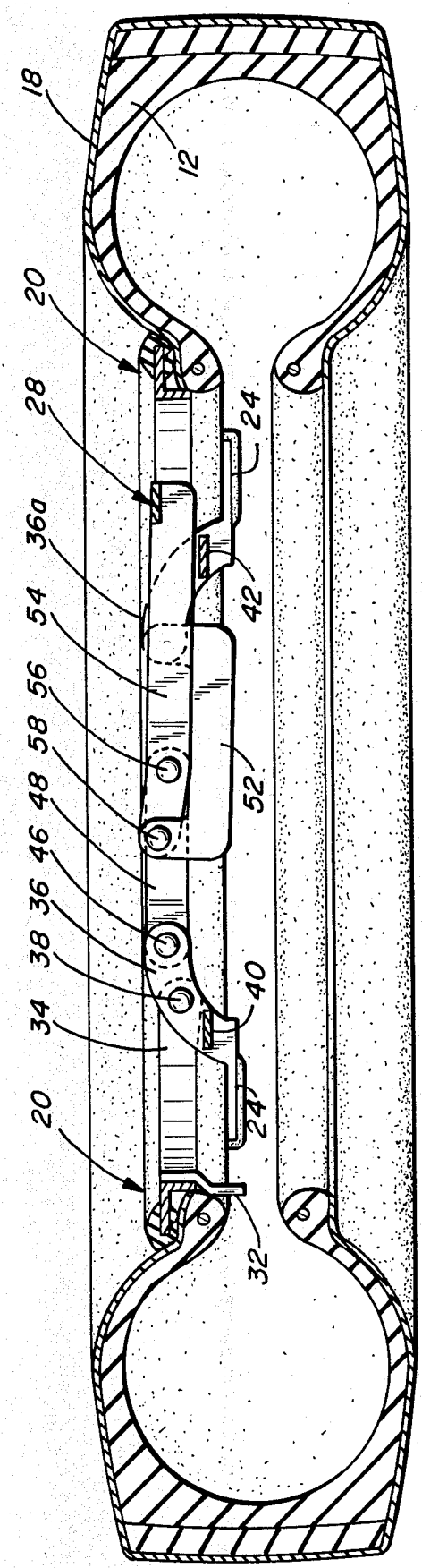
FIG._3
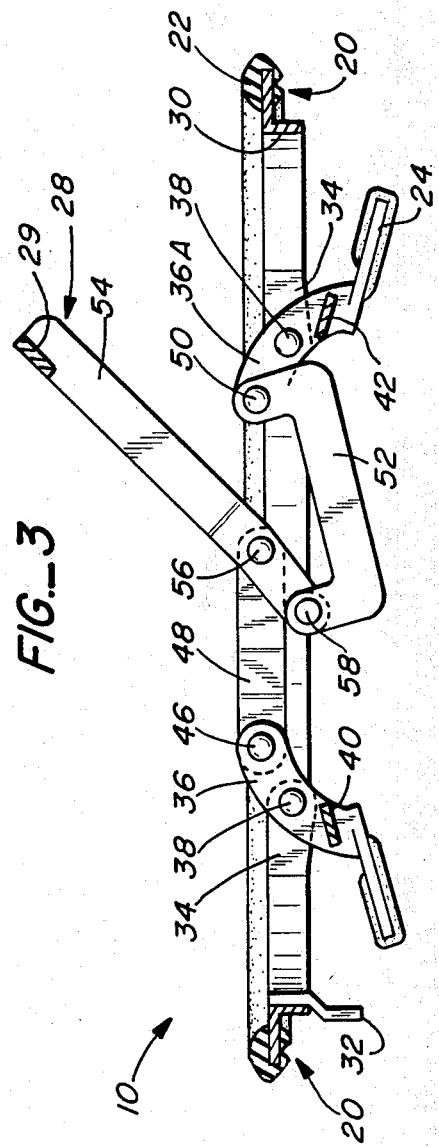
FIG._4

TIRE RECAPPING APPARATUS

This invention relates to apparatus for recapping tires and more particularly to an improved apparatus for use in recapping tires utilizing precured tread rubber.

BACKGROUND OF THE INVENTION

In a tire recapping process utilizing precured tread rubber the tread area of tire casing is first buffed to a smooth surface and then is covered by a thin layer of uncured bonding rubber. Thereafter, the bonding layer is covered by a precured tread rubber strip which is normally stitched or stapled in place on the tire. The entire tire assembly is then covered with a flexible envelope which extends over the tread area and downwardly along both tire sidewalls. An apparatus must then be utilized to seal both sides of the envelope against the outer tire surface, preferably in the bead area of the tire, before the assembly is placed in a chamber for a curing period.

Previous arrangements for accomplishing the envelope sealing in various tire recapping apparatus are shown in U.S. Pat. Nos. 4,274,897 and 4,624,732 both of which are assigned to the assignee of the present invention. In the former patent, a pair of grilles are utilized to press the envelope against the sidewalls of the tire by means of a series of coiled springs. In the latter patent a pair of ring members which are shaped to press against the envelope in the bead area of the tire being recapped are also held together by spring members. In another prior art apparatus shown in U.S. Pat. No. 4,579,619, a series of clamps are attached to each of a pair of ring members to secure and seal the envelope around each tire bead area.

While the aforesaid prior art arrangements provide satisfactory results for many recapping operations, the installation of the various apparatus components in carrying out the recapping process was often excessively time-consuming. One object of the present invention is to provide an improved recapping apparatus that will solve this problem and enable a single workman to install an envelope sealing apparatus on a tire recapping assembly quickly without the need for making multiple time-consuming connections and adjustments of moveable components.

Another object of the present invention is to provide an improved apparatus for sealing an envelope in a tire recapping process that requires the closure of only one moveable element in order to cause full sealing contact on the outer bead area of the tire and backup pressure at several locations on the inner bead area surface of the tire.

Still another object of the invention is to provide an apparatus for sealing an envelope in a precured rubber recapping process that is particularly well adapted for ease and economy of manufacture.

SUMMARY OF THE INVENTION

In accordance with the principles of the invention an apparatus for recapping a tire with precured tread rubber is provided that will seal an envelope around the tire assembly before it is placed in a curing chamber. In general, the apparatus comprises a pair of ring members each with a single clamping means which when activated will press the ring member firmly against the envelope in the bead area of the tire. The ring member pressure on the envelope is obtained by forcing the tire bead area against a series of spaced apart support pads that are positioned to bear against the inside surface of the tire bead at spaced apart locations. The clamping means comprises a single handle with a first linkage means fixed to a ring member and a second linkage means fixed to the support pads. The two linkage means are connected in such a way that when the handle is pressed toward a closing position, the ring member is moved toward the support pads with a substantial mechanical advantage. The linkage means are constructed so that as the handle moves toward the full clamping position into the plane of its ring member it acquires a tendency to stay in this clamped position. Thus when the tire bead portion and the covering envelope are between the ring member and support pads, the envelope becomes firmly sealed against the tire surface. This prevents the migration of air under the envelope during period of the recapping process and assures a uniform bonding of hhe tread rubber.

Other objects, advantages and features of the present invention will become readily apparent from the following detailed description of one embodiment thereof taken in conjunction with the accompanying drawing.

BRIEF DESCRIPTION OF THE DRAWING

FIG. 1 is a plan view of a tire recapping apparatus embodying principles of the present invention as it appears when installed on an envelope covered tire.

FIG. 2 is an enlarged view in section taken along line 2—2 of FIG. 1.

FIG. 3 is a view in section taken along line 3—3 of FIG. 1 showing one ring clamping member on the tire in its closed position.

FIG. 4 is a view in elevation and in section showing the ring clamping member of FIG. 3 above and in the unclamped position.

DETAILED DESCRIPTION OF EMBODIMENT

With reference to the drawing, FIG. 1 shows a tire recapping apparatus 10, according to the present invention as it appears when installed on a tire 12 that is being recapped using precured tread rubber. In a typical recapping process using precured tread rubber, the tire to be recapped is first prepared for recapping by buffing off the old tread. As shown in FIG. 2, the tread area is first covered with a layer of uncured bonding rubber 14 and then with a band or strip of premolded, precured tread rubber 16. A flexible curing envelope 18 is then placed over the tire assembly, thereby covering the tread rubber. This envelope must be sealed around the bead areas of the tire so that no air or gas can penetrate under the envelope as the tire assembly is being cured in a chamber to vulcanize the bonding rubber and thereby hold the tread rubber in place on the tire carcass. During this bonding process the envelope is sealed tightly around both beads of the tire by a pair of clamping ring assemblies 20.

Each clamping assembly ring 20 has an annular pressure ring portion 22 that is sized to fit around the outer bead area of the tire and a series of four backup pads 24 that are adapted to engage the inner bead area of the tire. A linkage means 26 is connected to both the pressure ring 22 and the backup pads 24 and is controllable by a manually operable handle 28 to move the ring 22 and the pads 24 together. When the tire bead portion is between the ring and the aligned pads, the ring 22 will press the envelope against the tire bead area and thus seal it.

Now, describing the clamping ring assembly 20 in greater detail, the pressure ring 22 as shown in FIG. 3 has a generally right angular cross section with its an annular ring portion 22 that bears against the tire sidewall and an integral cylindrical portion 30 which fits just inside the inner edge of the tire bead. Bonded to and surrounding the outer edge of the annular ring portion 22 is a continous soft rubber gasket 31. The inner side of this gasket is preferably formed with a serrated surface having at least two concentric circular ridges 33 that can exert concentrated sealing pressure against the tire being processed in its bead area.

Attached to the cylindrical portion 30 of the ring assembly 20 are a plurality of circumferentially spaced apart guide members 32 that extend longitudinally and help to align the clamping ring assembly 20 with the tire axis when it is installed on a tire being recapped. Also attached and extending inwardly from the cylindrical portion 30 of each pressure ring are four rigid pivot supports 34. (See also FIG. 1) Each of these supports is essentially a short strap-like piece of metal which is welded in place at specified locations on the cylindrical ring portion 30. As shown in FIGS. 3 and 4, a first pair of curved links 36 are pivotally attached near their mid-points to the outer ends of two supports 34 on one side of each ring portions 30 by a suitable pin 38. On the other side of the ring portion 30, a similar pair of curved links 36(a) are similarly attached to the other two supports 34.

Attached to one outer end of each curved link 36 and 36(a) is a backup pad 24 which is essentially a flat rigid piece of metal preferably having roughly a triangular shape. Since the pivot supports 34, as shown in FIG. 1, are attached to the ring portion 30 at four locations that are essentially equally spaced apart thereon, and the backup pads 24 are also located close to the same circumferentially spaced apart positions on each ring assembly 20. Each backup pad 24 is preferably covered by a soft rubber pad 35 which is bonded to both sides and fully covers the inner surface of each pad that contacts the inner bead area of the tire being recapped.

Interconnecting one pair of curved links 36 is a bar 40 and the other pair of curved links 36(a) are similarly interconnected by a bar 42. There two bars 40 and 42 are themselves interconnected by a coiled spring 44.

As seen in FIG. 3 and 4, the inner ends of each of the two curved links 36 is pivotally connected by a pin 46 to a another link 48 which is relatively straight when viewed horizontally as in FIG. 4, but is bent with a shallow "U" shape in plan view, as shown in FIG. 1.

Similarly, the inner end of each curved link 36(a) is pivotally connected by a pin 50 to one end of a link 52 which has a U-shape when viewed horizontally, as in FIG. 4.

The handle 28 has a central grip portion 29 with two spaced apart divergent arms 54. As shown in FIG. 4, the inner end of the link 48 is connected by a pin 56 at a point spaced upwardly from the end of each handle arm 54.

The inner end of the U-shaped link 52 is connected by a pin 58 to the end of the handle arm 54 at a point spaced from the pin 56 for the straight link 48.

Operation of the clamping ring assembly 20 can be readily understood by reference to FIG. 3 and 4. Assume that a tire has been properly prepared for recapping with the bonding layer 14 and tread rubber 16 in place, as shown in FIG. 2 and covered by a flexible envelope 18. A ring assembly 20 for each side of the tire can be quickly installed. With the handle 28 in the up position and the backup pads 24 retracted, the annular ring portion 22 is merely placed against the envelope 18 in the bead area of the tire. The guide members 32 serve to position the annular ring member on the tire with no margin for error and thus no requirement for time consuming adjustments. The operator now merely moves the handle 28 to its closed positions which is toward the plane of the ring member 22. As this handle movement takes place the links 36 and 36(a) are pivoted simultaneously past an equilibrium point to a position where the backup pads 24 engage the inner side of the tire bead. As further pressure is applied, the ring member 22 presses firmly against the envelope in the tire bead area to provide an effective seal. Once the handle reaches the full down position, it automatically stays closed, because of the relative position of the links 48 and 52 and assisted by the coiled spring 44.

With both clamping rings 20 installed, the entire tire assembly 10 can be placed in a suitable chamber to complete the recapping process in the conventional manner. After the curing period has been completed, the clamping rings 20 can be quickly and easily removed without special tools or extra labor by merely moving each handle 28 to its open, unlocked position.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A retreading curing ring device for mounting on a tire retreading assembly that includes a tire carcass defining a retread area and integral sidewalls having inner circular beads adjacent their free ends, a free layer of uncured rubber positioned on said tread area, a preformed tread strip covering said uncured rubber layer and a flexible envelope surrounding such tread strip and said sidewalls and extending downwardly toward said circular beads, said curing ring device being positioned adjacent one of said sidewalls for securing such envelope to such tire for curing, said curing ring device comprising:

a circular body member for engaging a portion of the envelope and the circular tire bead;
    guide means adjacent said circular body member for concentrically aligning said tire carcass relative to said circular body member;
    a plurality of moveable backup means spaced inwardly from said circular body member and at predetermined spaced apart circumferential locations relative to said circular body member and adapted to engage the inside of said tire sidewall in its bead area;
    a single handle means;
    linkage means interconnecting said backup means and said circular body member and controllable by said handle means for moving said circular body member and backup means together, thereby pressing and sealing said envelope against the bead portion of the tire.

2. The curing ring device as described in claim 1 wherein said circular body has a generally right angular cross section including an annular portion for pressing against the envelope and an integral cylindrical portion to which said guide means are attached.

3. The curing ring device as described in claim 2 including a soft rubber gasket on said annular portion having a plurality of concentric ridges for exerting concentrated sealing pressure against the tire.

4. The curing ring device described in claim 1 wherein said handle means has a central grippping section with a pair of diverging arm portions extending from opposite ends therefore.

5. The curing ring device described in claim 4 wherein said linkage means comprises:
- first and second pairs of curved links each having an inner end and a said backup means connected to an outer end;
- means on said circular body for pivotally supporting each said curved link;
- a pair of bars interconnecting each said pair of curved links;
- a third pair of links each connected at one end to an inner end of a said first link and connected at its other end to said diverging arms of said handle means;
- a fourth pair of links each connected at one end to an inner end of a second link and connected at its other end to a said diverging arms of said handle means at a location thereon spaced from the connection of said third link;
- whereby movement of said handle means caused rotation of said first and second pairs of curved links and thus movement of said backup means against the inside of the tire bead at spaced apart locations thereby pressing the tire bead and the envelope said circular body member.

6. The curing ring device as described in claim 5 including a coiled spring connected to said pair of bars for urging them together.

7. The curing ring device as described in claim 5 wherein said third pair of links are pivotally attached to said handle arms at points spaced from the ends thereof and said fourth pair of links are pivotally attached at points located nearer the ends thereof, so that as the handle means is moved in its closing directly, tension is applied to both third and fourth pairs of links, thereby causing them to move said backup means into their closed position.

8. The curing ring device as described in claim 7 wherein each said backup means comprises a flat plate extending outwardly from a first or second link and adapted to press against a limited inside area of tire bead when in the closed position.

9. The curing ring device as described in claim 8 wherein each said backup means has a layer of soft rubber material on the flat plate which contacts the inside area of the tire bead.

10. The curing ring device as described in claim 7 wherein said handle means is substantially parallel with the plane of said circular body member when in the fully closed position.

* * * * *